United States Patent
Nakao

(10) Patent No.: US 10,001,653 B2
(45) Date of Patent: Jun. 19, 2018

(54) SPATIAL IMAGE DISPLAY APPARATUS

(71) Applicant: Sony Corporation, Tokyo (JP)

(72) Inventor: Isamu Nakao, Tokyo (JP)

(73) Assignee: Sony Corporation, Tokyo (JP)

( * ) Notice: Subject to any disclaimer, the term of this patent is extended or adjusted under 35 U.S.C. 154(b) by 369 days.

(21) Appl. No.: 14/661,265

(22) Filed: Mar. 18, 2015

(65) Prior Publication Data

US 2015/0279283 A1    Oct. 1, 2015

(30) Foreign Application Priority Data

Mar. 27, 2014  (JP) ................................ 2014-066892

(51) Int. Cl.
| | | |
|---|---|---|
| *G02B 27/22* | (2018.01) | |
| *G09G 5/02* | (2006.01) | |
| *G09G 3/34* | (2006.01) | |

(52) U.S. Cl.
CPC ....... *G02B 27/2292* (2013.01); *G09G 3/3406* (2013.01); *G09G 5/026* (2013.01); *G09G 2300/023* (2013.01); *G09G 2300/0452* (2013.01); *G09G 2320/0233* (2013.01); *G09G 2320/0295* (2013.01); *G09G 2320/0626* (2013.01); *G09G 2320/0646* (2013.01); *G09G 2340/0457* (2013.01)

(58) Field of Classification Search
CPC ........ G02B 17/086; G02B 17/08; G02B 5/08; G02B 27/2292; G09G 3/3473; G09G 3/3406; G09G 3/346; G09G 2320/0295; G09G 2320/0646; G09G 2320/0626; G09G 2320/0233; G09G 2340/0457
See application file for complete search history.

(56) References Cited

U.S. PATENT DOCUMENTS

| | | | | |
|---|---|---|---|---|
| 5,755,501 A | * | 5/1998 | Shinohara ............ | G02B 5/1866 349/118 |
| 2013/0038934 A1 | * | 2/2013 | Imamura ............... | G02B 27/286 359/489.02 |
| 2014/0253880 A1 | * | 9/2014 | Yoneno .................. | G03B 21/28 353/10 |
| 2015/0245007 A1 | | 8/2015 | Hyodo et al. | |
| 2015/0277132 A1 | | 10/2015 | Nakao et al. | |

FOREIGN PATENT DOCUMENTS

JP     2008-158114 A    7/2008

OTHER PUBLICATIONS

U.S. Appl. No. 14/620,380, filed Feb. 12, 2015, Hyodo et al.
U.S. Appl. No. 14/661,094, filed Mar. 18, 2015, Nakao et al.

* cited by examiner

*Primary Examiner* — David Tung
(74) *Attorney, Agent, or Firm* — Wolf, Greenfield & Sacks, P.C.

(57) ABSTRACT

A spatial image display apparatus includes a display element including a plurality of pixels which are two-dimensionally arranged, and an imaging device that has a substrate including a plurality of dihedral corner reflectors arranged, the display element is disposed in a first space on one main surface of the substrate, and the imaging device forms a real image of a display image by the display element, in a second space on the other main surface of the substrate. The plurality of pixels are arranged in a period corresponding to a frequency that is equal to or less than a minimum spatial frequency at which an MTF value relative to a spatial frequency of the imaging device is minimized.

3 Claims, 14 Drawing Sheets

SPATIAL IMAGE DISPLAY APPARATUS

CROSS REFERENCE TO RELATED APPLICATIONS

This application claims the benefit of Japanese Priority Patent Application JP 2014-066892 filed Mar. 27, 2014, the entire contents of which are incorporated herein by reference.

BACKGROUND

The present disclosure relates to a spatial image display apparatus that displays an image in a space.

An optical system is disclosed in Japanese Unexamined Patent Application Publication No. 2008-158114 that forms an image of an object that is placed on a lower surface of a plane-symmetric imaging device, in a plane-symmetric position on an upper surface of the device, by using the device. A plurality of vertical holes having a cross-section of a square are provided in a matrix on a substrate of the plane-symmetric imaging device used in the optical system, and two mirror surfaces termed a dihedral corner reflector (DCR), which are orthogonal to each other are formed on an inner wall of each of the vertical holes. In an imaging device including a dihedral corner reflector array (DCRA) element in which a plurality of the dihedral corner reflectors are arranged on the substrate, when light emitted from the object passes through the vertical holes on the substrate, the light is reflected once at each of the two mirror surfaces constituting the dihedral corner reflector. Then, the reflected light is imaged at a position which is plane-symmetric to the substrate. As a result, the observer views a formed image (real image) that appears to be floating in a space of the upper surface of the imaging device.

SUMMARY

When the dihedral corner reflector array element as described above displays a real image of a display image by, for example, a two-dimensional display panel in a space, it is desirable to optimize the pixel structure of the two-dimensional display panel and the content of the display image depending on the optical characteristics of the dihedral corner reflector array element.

It is desirable to provide a spatial image display apparatus capable of obtaining a spatial image with a good visibility.

A spatial image display apparatus according to a first embodiment of the present disclosure includes a display element including a plurality of pixels which are two-dimensionally arranged, and an imaging device that includes a substrate having a plurality of dihedral corner reflectors arranged, in which the display element is disposed in a first space on one main surface of the substrate, and the imaging device forms a real image of a display image by the display element, in a second space on the other main surface of the substrate, in which the plurality of pixels are arranged in a period corresponding to a frequency that is equal to or less than a minimum spatial frequency at which an MTF value relative to a spatial frequency of the imaging device is minimized.

A spatial image display apparatus according to a second embodiment of the present disclosure includes a display element that includes a plurality of pixels which are two-dimensionally arranged, and displays an image based on an input image signal, an imaging device that includes a substrate having a plurality of dihedral corner reflectors arranged, in which the display element is disposed in a first space on one main surface of the substrate, and the imaging device forms a real image of a display image by the display element, in a second space on the other main surface of the substrate, and a brightness adjusting unit that adjusts brightness of the input image signal, based on MTF characteristics relative to a spatial frequency of the imaging device.

In the spatial image display apparatus according to the first embodiment of the present disclosure, the plurality of pixels of the display element are arranged in a period corresponding to a frequency that is equal to or less than a minimum spatial frequency at which the MTF value relative to the spatial frequency of the imaging device is minimized, and thus it is possible to reduce the image quality deterioration of the spatial image due to variations in the MTF characteristics of the imaging device.

In the spatial image display apparatus according to the second embodiment of the present disclosure, the brightness of the input image signal is adjusted based on the MTF characteristics relative to the spatial frequency of the imaging device by the brightness adjusting unit, and thus it is possible to reduce the image quality deterioration of the spatial image due to variations in the MTF characteristics of the imaging device.

According to the spatial image display apparatus according to the first embodiment of the present disclosure, the plurality of pixels of the display element are arranged in a period corresponding to a frequency that is equal to or less than a minimum spatial frequency at which the MTF value relative to the spatial frequency of the imaging device is minimized, and thus it is possible to obtain a spatial image with a good visibility.

According to the spatial image display apparatus according to the second embodiment of the present disclosure, the brightness of the input image signal is adjusted based on the MTF characteristics relative to the spatial frequency of the imaging device, and thus it is possible to obtain a spatial image with a good visibility.

In addition, the effects described herein are not necessarily limited, and may be any of the effects described in this disclosure.

DETAILED DESCRIPTION OF EMBODIMENTS

Hereinafter, embodiments of the present disclosure will be described in detail with reference to the drawings. The description will be given in the following order.

Figure 1:
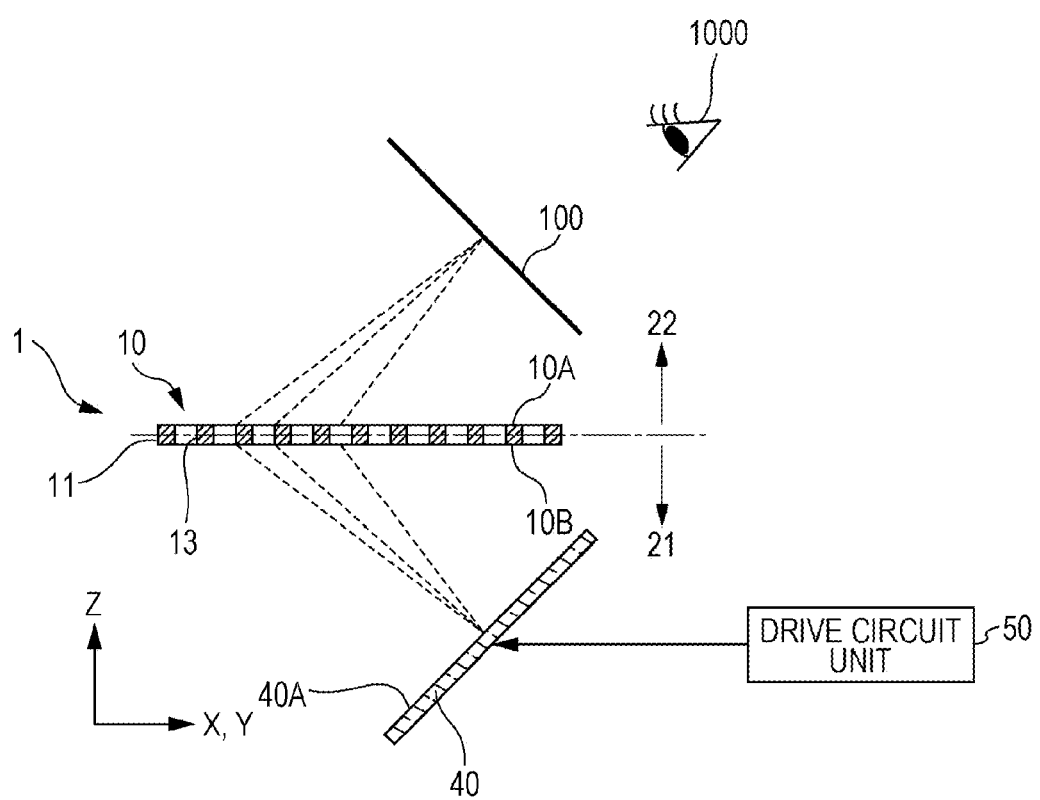
FIG. 1 is a cross-sectional view illustrating a configuration example of a spatial image display apparatus according to a first embodiment of the present disclosure.

1. First embodiment (spatial image display apparatus including a display element in which a period of a pixel is optimized) (FIG. 1 to FIG. 12)
 1.1 Overall configuration example of spatial image display apparatus
 1.2 Configuration example of imaging device
 1.3 Action
 1.4 Effect
2. Second embodiment (spatial image display apparatus with optimized brightness of input image signal) (FIG. 13 to FIG. 17)
3. Third embodiment (spatial image display apparatus with a polarizer) (FIG. 18)
4. Fourth embodiment (Application cases of spatial image display apparatus) (FIG. 19)
5. Other embodiments 1. First Embodiment 1.1 Overall Configuration Example of Spatial Image Display Apparatus FIG. 1 illustrates a configuration example of a spatial image display apparatus 1 according to a first embodiment of the present disclosure. The spatial image display apparatus 1 includes an imaging device 10 as a plane-symmetric imaging device, a display element 40, and a drive circuit unit 50. The imaging device 10 includes a substrate 11 having a plurality of dihedral corner reflectors 13 arranged therein.

In FIG. 1, a direction perpendicular to a substrate surface of the imaging device 10 is a Z-axis direction, and directions perpendicular to each other in a plane parallel to the substrate surface of the imaging device 10 are X-axis and Y-axis directions. The same is applied to the following other drawings.

The display element 40 is disposed on a first space 21 on one main surface (lower surface 10B) side of a substrate 11 of the imaging device 10. The imaging device 10 forms a real image 100 of a display image by the display element 40, at a position which is plane-symmetric to the substrate 11, in a second space 22 on the other main surface (upper surface 10A) side of the substrate 11. An observer 1000 can recognize the real image 100 formed in the second space 22 as a spatial image.

Figure 2:
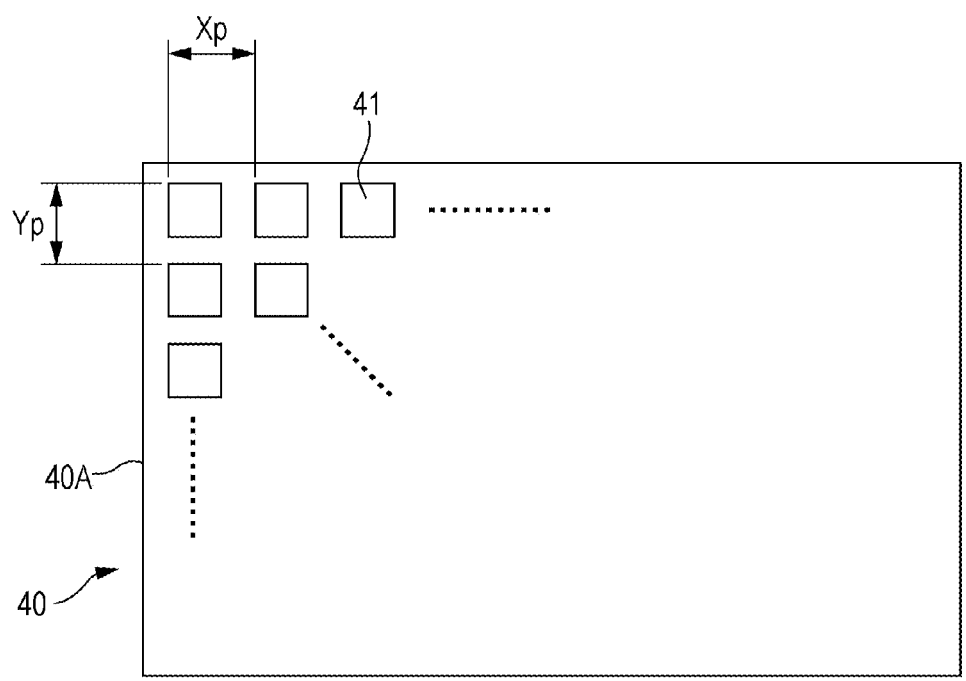
FIG. 2 is a plan view illustrating a configuration example of a display element.

The display element 40 is driven by the drive circuit unit 50, and displays a display image on an image display surface 40A, based on an input image signal from an outside. The display element 40 is, for example, a flat display panel such as a liquid crystal panel or an organic EL panel. The display element 40 includes, as illustrated in FIG. 2, a plurality of pixels 41 which are two-dimensionally arranged. Each pixel 41 emits diverging light having a predetermined divergence angle. The display element 40 emits the diverging light from the image display surface 40A. The light emitted from the display element 40 is adapted to be incident on the lower surface 10B of the imaging device 10. The display element 40 displays, for example, a display image in a visible range. Thus, the observer 1000 can recognize the real image 100 in the visible range as a spatial image. Each pixel 41 may have, for example, sub-pixels of R (red), G (green), and B (blue).

The plurality of pixels 41 are two-dimensionally arranged in a predetermined period corresponding to a frequency that is equal to or less than a minimum spatial frequency at which an MTF value relative to the spatial frequency of the imaging device 10 is minimized, for the reasons described later. Since a pixel pitch Xp of a horizontal direction in the plane and a pixel pitch Yp of a vertical direction in the plane are optimized, the plurality of pixels 41 have a predetermined period. When each pixel 41 is configured with R, G, and B sub-pixels, it is desirable that the sub-pixels of the same color are optimized so as to have a predetermined period.

Figure 3:
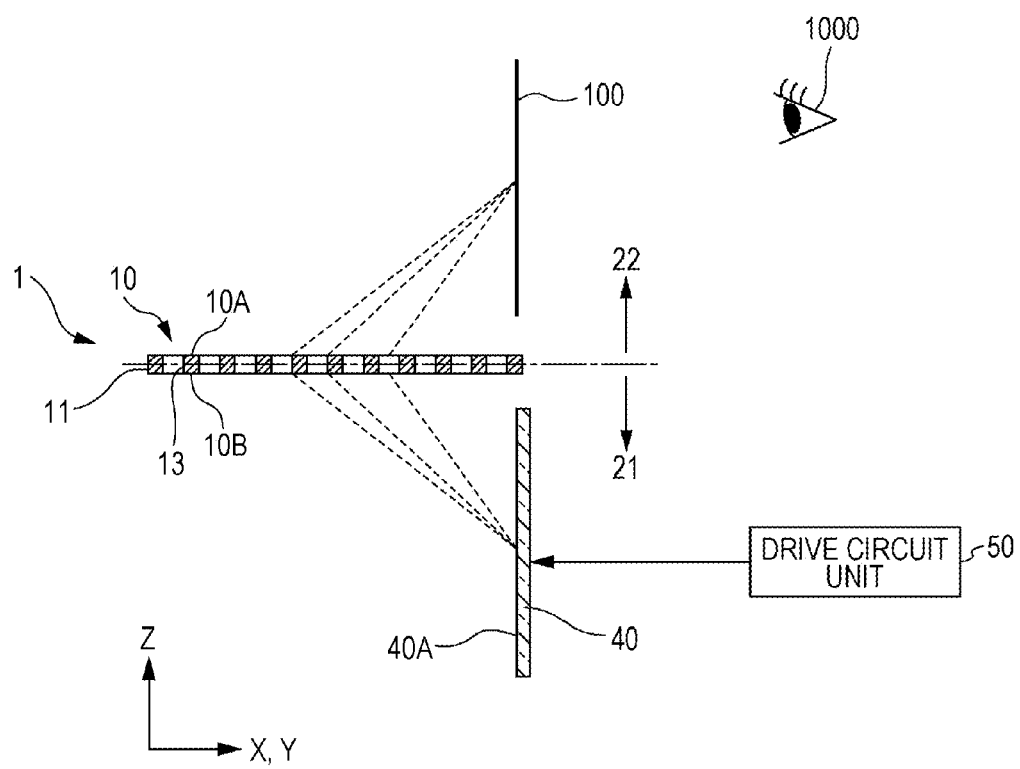
FIG. 3 is a cross-sectional view illustrating a first modification of the spatial image display apparatus according to the first embodiment.
Figure 4:
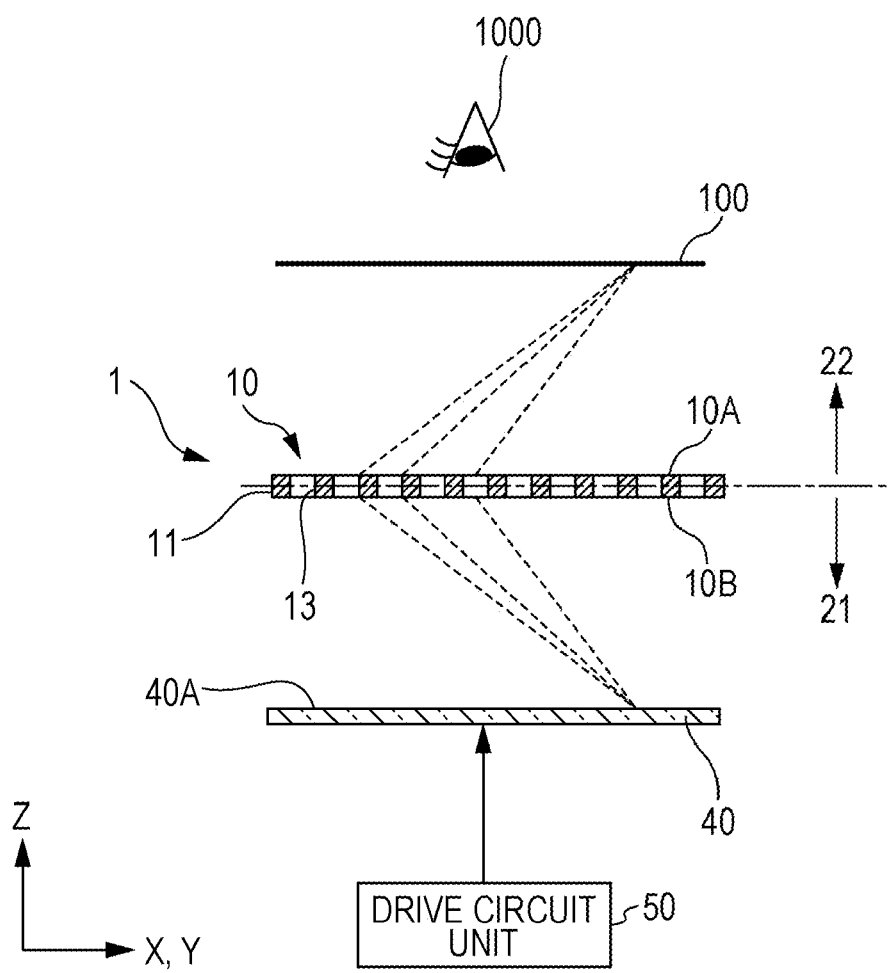
FIG. 4 is a cross-sectional view illustrating a second modification of the spatial image display apparatus according to the first embodiment.

In addition, in FIG. 1, the image display surface 40A of the display element 40 is disposed so as to be inclined to the substrate surface of the imaging device 10, but for example, as illustrated in FIG. 3, the image display surface 40A may be disposed so as to be substantially perpendicular to the substrate surface of the imaging device 10. In this case, the real image 100 in a space is also formed so as to be substantially perpendicular to the substrate surface of the imaging device 10. Further, for example, as illustrated in FIG. 4, the image display surface 40A may be disposed so as to be substantially parallel to the substrate surface of the imaging device 10. In this case, the real image 100 in a space is also formed so as to be substantially parallel to the substrate surface of the imaging device 10.

1.2 Configuration Example of Imaging Device

Figure 5:
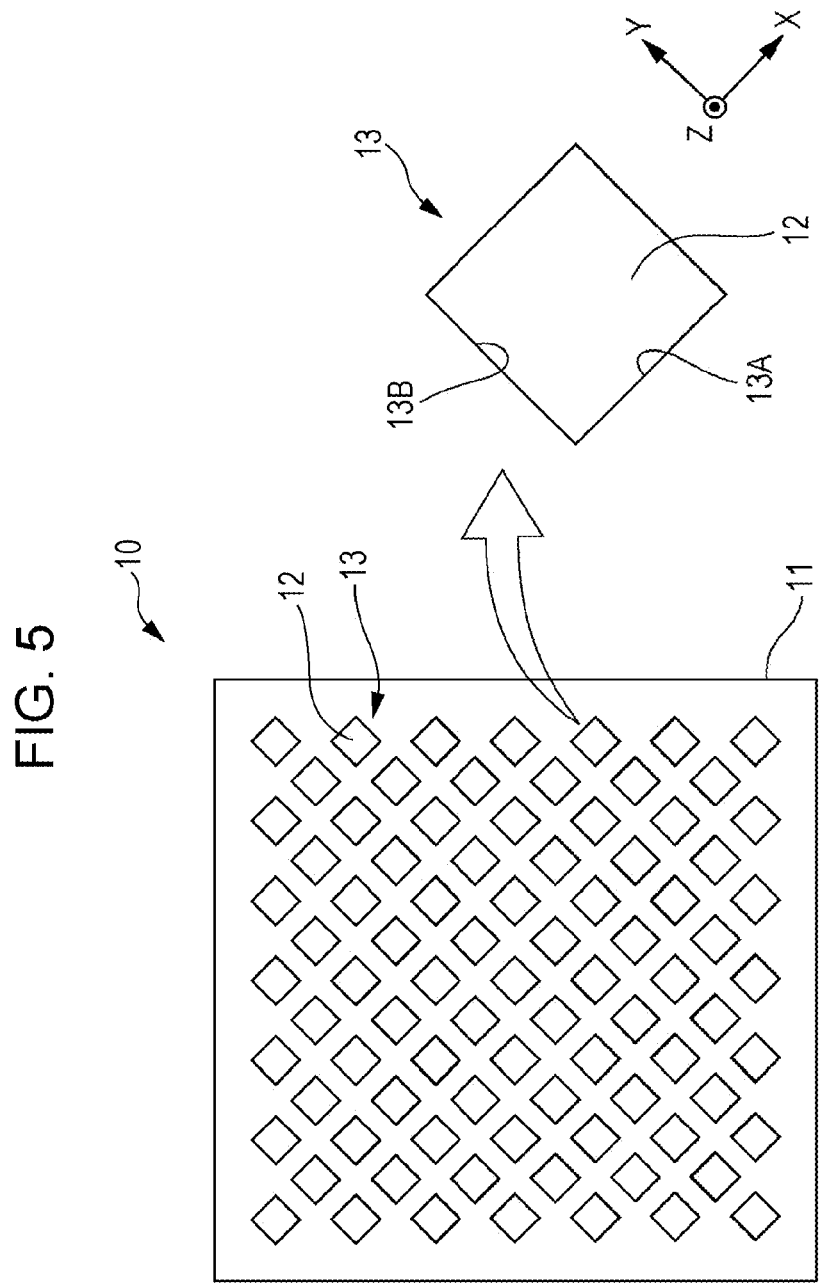
FIG. 5 is a plan view illustrating a configuration example of an imaging device in the spatial image display apparatus.
Figure 6:
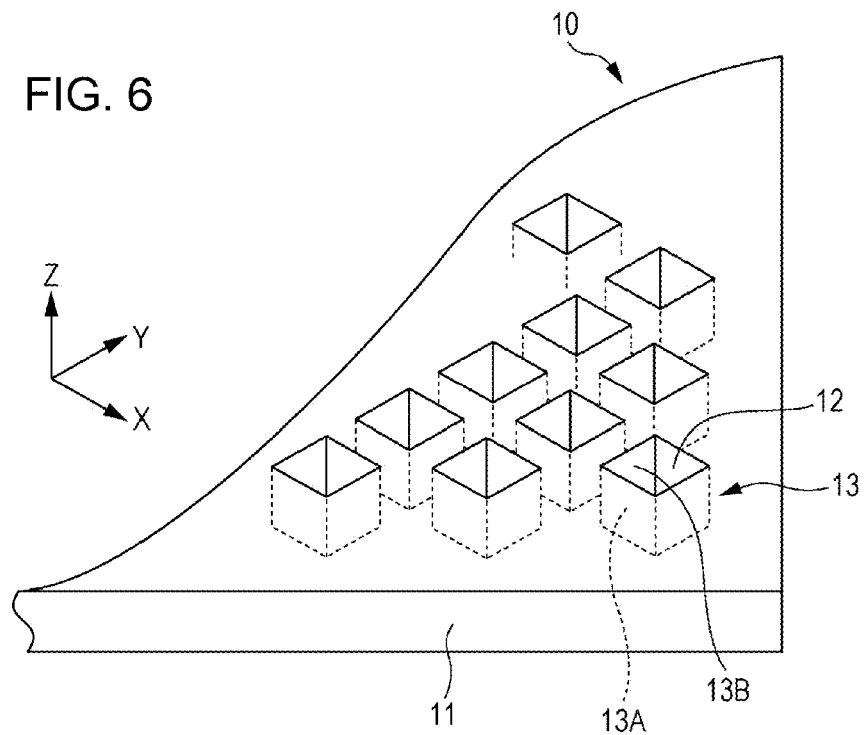
FIG. 6 is a partial perspective view illustrating a configuration example of the imaging device in the spatial image display apparatus.

The imaging device 10, as illustrated in FIG. 5 and FIG. 6, includes a plurality of openings 12 disposed in a matrix on the substrate 11. Each opening 12 penetrates through the substrate 11 in a thickness direction (Z-axis direction), and transmits the light incident from the lower surface 10B side of the substrate 11 to the upper surface 10A side of the substrate 11. Each opening 12, for example, has a void. Each opening 12 may be provided in a convex structure which is formed on the upper surface 10A of the substrate 11. The substrate 11 may have a light-shielding (light reflecting or light absorbing) member, in a portion other than portions including respective openings 12 formed therein.

The dihedral corner reflector 13 is formed as a micro-optical element on the side surface of each opening 12. In other words, the imaging device 10 includes a plurality of dihedral corner reflectors 13 which are arranged in a matrix. Each of the dihedral corner reflectors 13 is configured to include a first reflecting surface 13A and a second reflecting surface 13B, which are perpendicular to each other. The first reflecting surface 13A is parallel to, for example, an XZ plane, and the second reflecting surface 13B is parallel to, for example, a YZ plane.

1.3 Action

Action of Imaging Device 10

Figure 7:
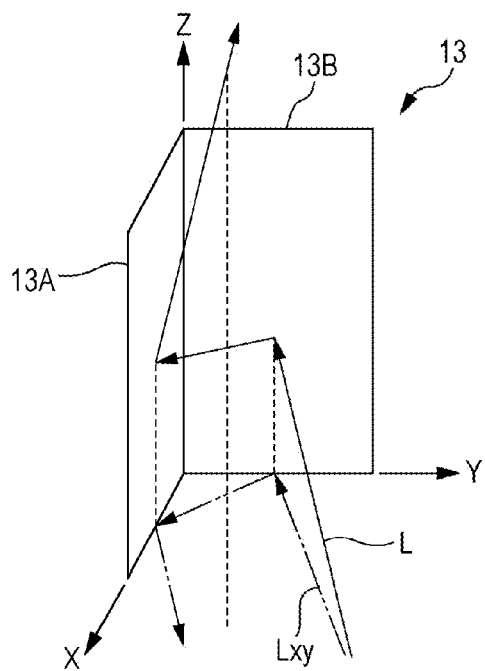
FIG. 7 is a perspective view illustrating an operation of the imaging device.
Figure 8:
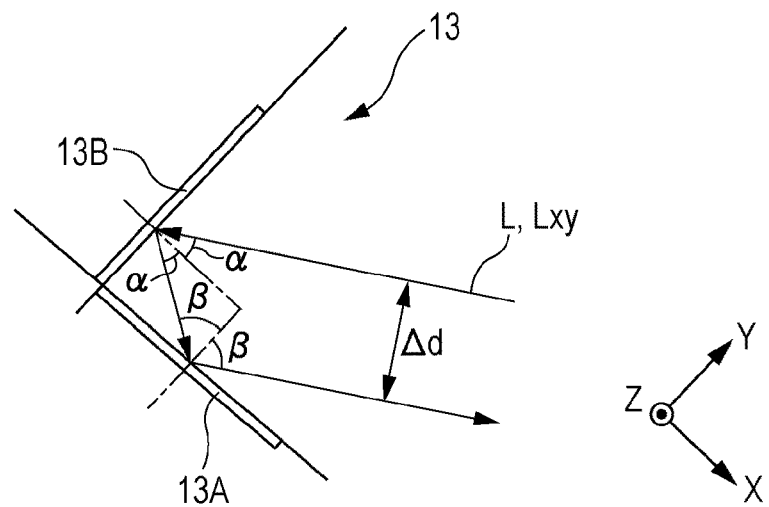
FIG. 8 is a cross-sectional view illustrating an operation of the imaging device.
Figure 9:
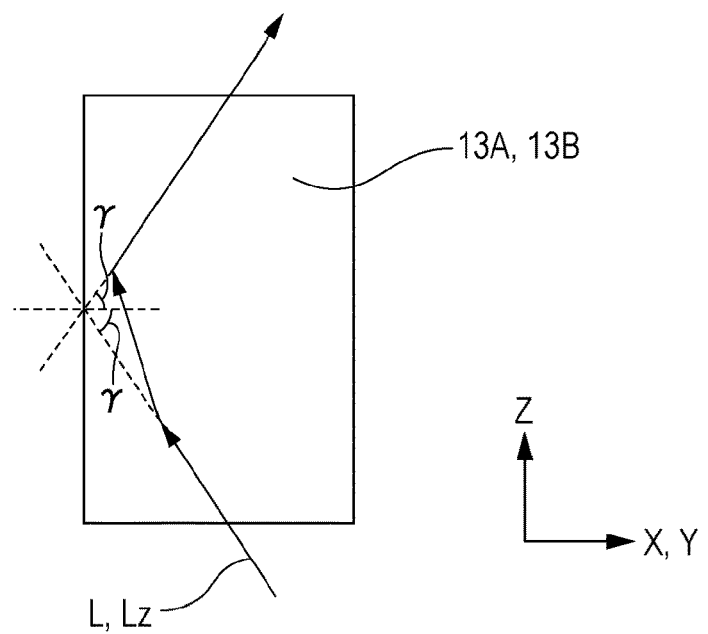
FIG. 9 is a cross-sectional view illustrating an operation of the imaging device.
Figure 10:
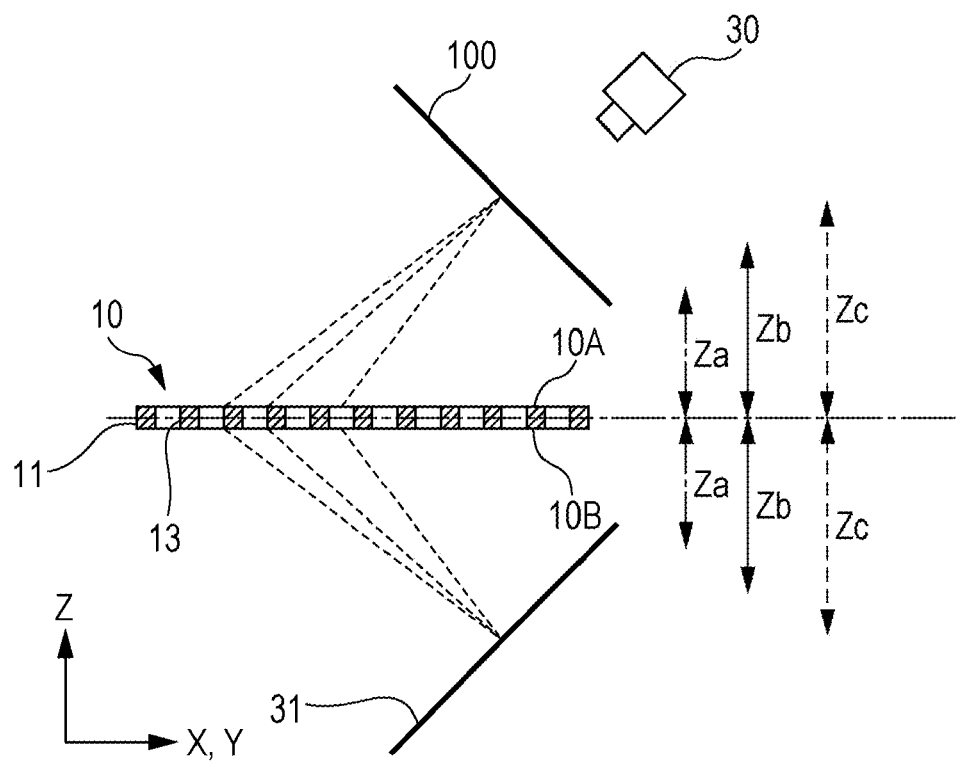
FIG. 10 is a cross-sectional view illustrating a measurement environment of MTF characteristics of the imaging device.

A description will be given about the optical action of the imaging device 10 with reference to FIG. 7 to FIG. 9. FIG. 7 illustrates an example of a progress state of light L incident on one of the dihedral corner reflectors 13 of the imaging device 10. FIG. 8 illustrates an example of a progress state of a component Lxy of light L in the XY-axis directions (progress state of the light L in an XY plane). FIG. 9 illustrates an example of a progress state of a component Lz of the light L in the Z-axis direction (progress state of the light L in an XZ plane and a YZ plane).

As illustrated in FIG. 8, in the XY plane, the light L incident from the lower surface 10B side of the imaging device 10, for example, is incident on the second reflecting surface 13B at an incidence angle α and is reflected by an exit angle α, and thereafter, is incident on the first reflecting surface 13A at an incidence angle β and is reflected by an exit angle β. Thus, the light beams incident on the first and second reflecting surfaces 13A and 13B at angles other than the normal directions of the first and second reflecting surfaces 13A and 13B return back in the progressed directions, by the first and second reflecting surfaces 13A and 13B. Here, a misalignment amount Δd with the optical axis of the light incident on the dihedral corner reflector 13 and the optical axis of the light which is reflected back from the dihedral corner reflector 13 is smaller than the diameter of the opening 12. Thus, the X-Y axis direction components of the light that is incident on the first and second reflecting surfaces 13A and 13B at an angle other than each of the normal directions of the first and second reflecting surfaces 13A and 13B are retro-reflected by the first and second reflecting surfaces 13A and 13B.

Meanwhile, as illustrated in FIG. 9, in the XZ plane and the YZ plane, the light L incident from the lower surface 10B side of the imaging device 10, for example, is incident on the second reflecting surface 13B at an incidence angle γ and is reflected by an exit angle γ, and thereafter, is incident on the first reflecting surface 13A at an incident angle γ, is reflected by an exit angle γ, and is emitted to the upper surface 10A side of the imaging device 10. Therefore, in the Z-axis direction, retro-reflection by the first and second reflecting surfaces 13A and 13B does not appear. From the above fact, the dihedral corner reflector 13 normally reflects the incident light beam in the Z-axis direction component parallel to the normal line of the substrate 11 of the imaging device 10, and retro-reflects the incident light beam in the XY-axis direction components parallel to the lower surface 10B of the imaging device 10.

For example, when a light emitting body that emits diverging light or a light irradiation body is arranged on the lower surface 10B side of the imaging device 10, the diverging light emitted from the light emitting body or the light irradiation body passes through the imaging device 10, and is converged (imaged) at a plane-symmetric position with the imaging device 10 as a reference, at a positional relationship with respect to the light emitting body or the light irradiation body. Therefore, imaging device 10 functions as a plane-symmetric imaging device that converges (images) the diverging light from the light emitting body or the light irradiation body that is incident on the imaging device 10 at a plane-symmetric position, with the imaging device 10 as a reference, at the positional relationship with respect to the light emitting body or the light irradiation body.

By the optical effect of the imaging device 10 as described above, as illustrated in FIG. 1, a real image 100 of the display image by the display element 40 is imaged at a position which is plane-symmetric to the substrate 11. The observer 1000 is able to recognize the real image 100 which is formed, as a spatial image.

Method of Manufacturing Imaging Device 10

The imaging device 10 can be manufactured by, for example, Lithographie Galvanoformung Abformung (LIGA). A pattern corresponding to the openings 12 illustrated in FIG. 5 is formed on a poly dimethylsiloxane (PDMS) substrate by direct drawing photolithography, by lifting off of an X-ray mask of a metal or carbon. For example, a pattern is formed which has squares of a 100 μm square shape arranged at an interval of 200 μm in an XY direction in a plane. A desired opening shape is obtained by a sample constituting the substrate 11 being irradiated and exposed with X-rays which are collimated by a synchrotron radiation light and developed. Since the X-ray absorption rate of plastic such as PDMS is low, the exposure by X-rays is a technique capable of obtaining a shape of a high aspect ratio for a back side of a sample. Next, a reflective film such as a metal is formed on the entire surface of a transparent sample. For example, gold of several μm is deposited by plating. This enables forming a dihedral corner reflector 13. It is possible to deposit gold by depositing chromium or titanium as a base film. As a deposition method, it is possible to use a sputtering method other than plating. MTF characteristics of imaging device 10

Next, MTF characteristics will be described as an imaging performance of the imaging device 10. The change in the MTF for a spatial frequency of the imaging device 10 is measured by using an optical system in FIG. 10. In other words, a test chart 31 is disposed in the first space 21 on the lower surface 10B side of the substrate 11 of the imaging device 10, a real image 100 of the test chart 31 is formed at a position that is plane-symmetric to the substrate 11 in the second space 22 on the upper surface 10A side of the substrate 11, and a camera unit 30 performs measurement. An Xe lamp is used as a light source, and the test chart 31 of US Air force is illuminated with white light diffused once by a diffusion plate. The real image 100 of the test chart 31 is captured by the camera unit 30 including an objective lens of NA 0.1, PLAN APO 10X, and a charge coupled device (CCD) camera (pixel size 7.4 μm angle), and a degree of modulation is measured for a spatial frequency pattern of about 10 to 1 (line pairs/mm) by setting a gray level difference occurred when full white light and full black light are projected to 100%. The measurement is performed for respective cases where a distance between the imaging device 10 and an object (test chart 31), in other words, when assuming a distance between the imaging device 10 and the real image 100 as a Zb, a Za shorter than the Zb, and a Zc longer than the Zb.

Figure 11:
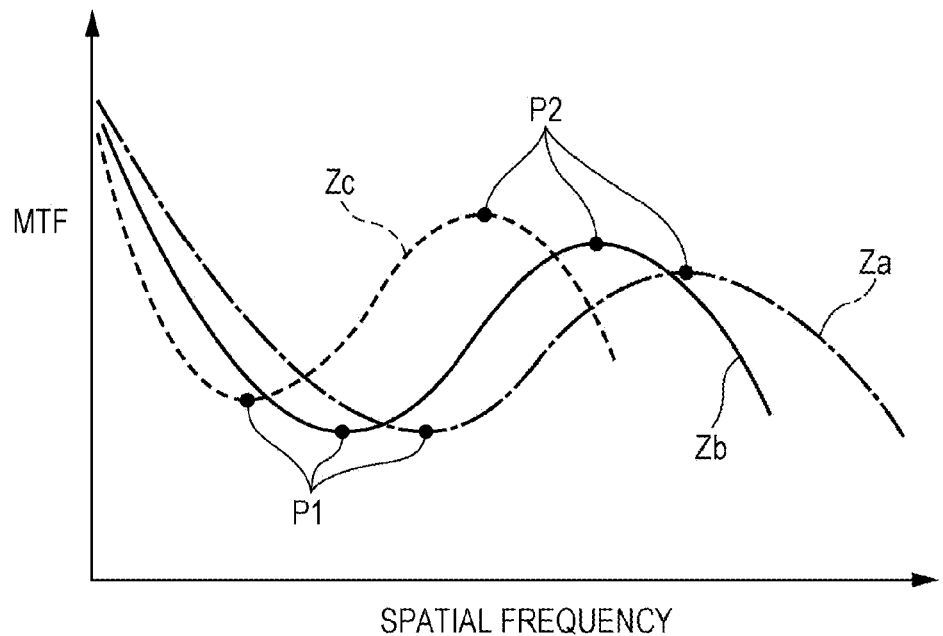
FIG. 11 is a characteristic diagram illustrating an example of the MTF characteristics of the imaging device.

FIG. 11 illustrates the measurement results. In FIG. 11, a horizontal axis represents a spatial frequency, and a vertical axis represents an MTF value. As illustrated in FIG. 11, characteristics are obtained in which the MTF value does not monotonically decrease with an increase in the spatial frequency, however, as the spatial frequency increases, once the MTF value has a minimum point P1, it has a maximum point P2, and thereafter the MTF value decreases again and reaches a resolution limit. As the distance of the imaging device 10 relative to the object and the real image 100 decreases, it can also be seen that the MTF peaks once at the maximum point P2 at a higher spatial frequency.

Figure 12:
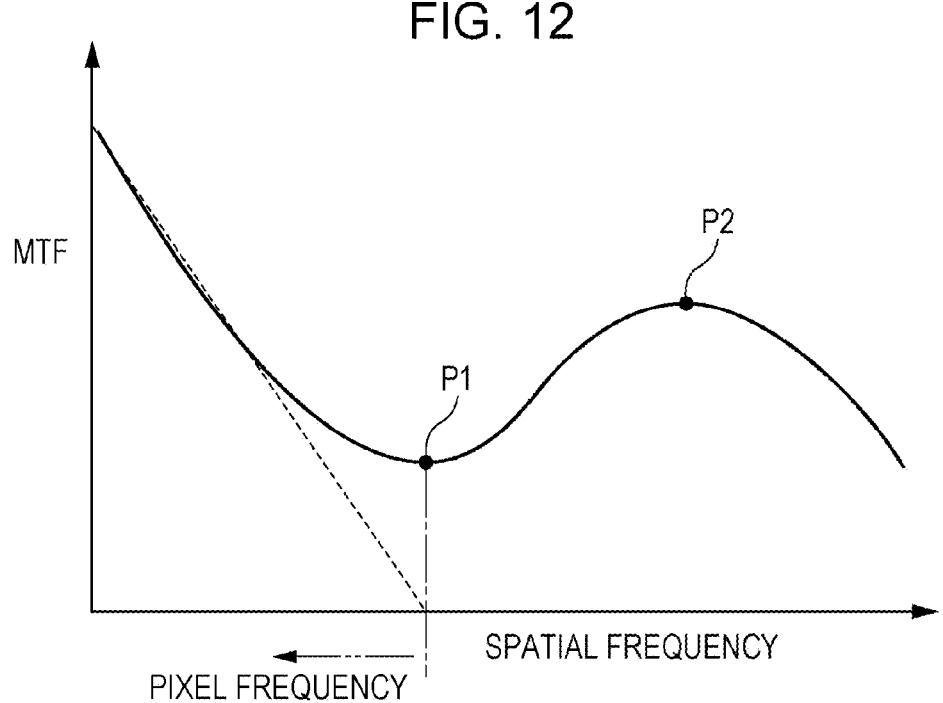
FIG. 12 is an explanatory diagram illustrating a correspondence between the MTF characteristics of the imaging device and a pixel period of the display element.

In general, the MTF of the imaging optical system monotonically decreases with an increase in the spatial frequency. The MTF characteristics having the minimum point P1 and the maximum point P2 as illustrated in FIG. 11 can be considered as properties unique to a dihedral corner reflector array constituting the imaging device 10. Such MTF characteristics allow the contrast of only a specific periodic structure of an image displayed on the display element 40 which is a two-dimensional display to be emphasized or attenuated, and thus the quality of the display image is impaired. Therefore, in order to provide a spatial image without making the observer 1000 feel discomfort, as illustrated in FIG. 12, the period (or pixel frequency) of the pixel 41 of the display element 40 corresponding to the object can be achieved by setting the period as a period (or pixel frequency) corresponding to a frequency that is equal to or less than the minimum spatial frequency. It is possible to prevent image quality deterioration of the spatial image by the change in the MTF for the spatial image of the imaging device 10 by the pixel period.

1.4 Effect

According to the present embodiment, since the plurality of pixels 41 of the display element 40 are arranged in a period corresponding to a frequency that is equal to or less than a minimum spatial frequency at which the MTF value relative to the spatial frequency of the imaging device 10 is minimized, it is possible to reduce the image quality deterioration of the spatial image due to variations in the MTF characteristics of the imaging device 10. Thus, it is possible to obtain a spatial image with a good visibility.

In addition, the effects described herein are merely illustrative and do not limit the effects of the present disclosure, and there may be other effects. The same is applied to the other embodiments later.

2. Second Embodiment (Spatial Image Display Apparatus with Optimized Brightness of Input Image Signal)

Next, a description will be given about a spatial image display apparatus according to a second embodiment of the present disclosure. In addition, substantially the same parts as in the spatial image display apparatus 1 according to the first embodiment are denoted by the same reference numerals in the following, and a description thereof will be omitted as appropriate.

Figure 13:
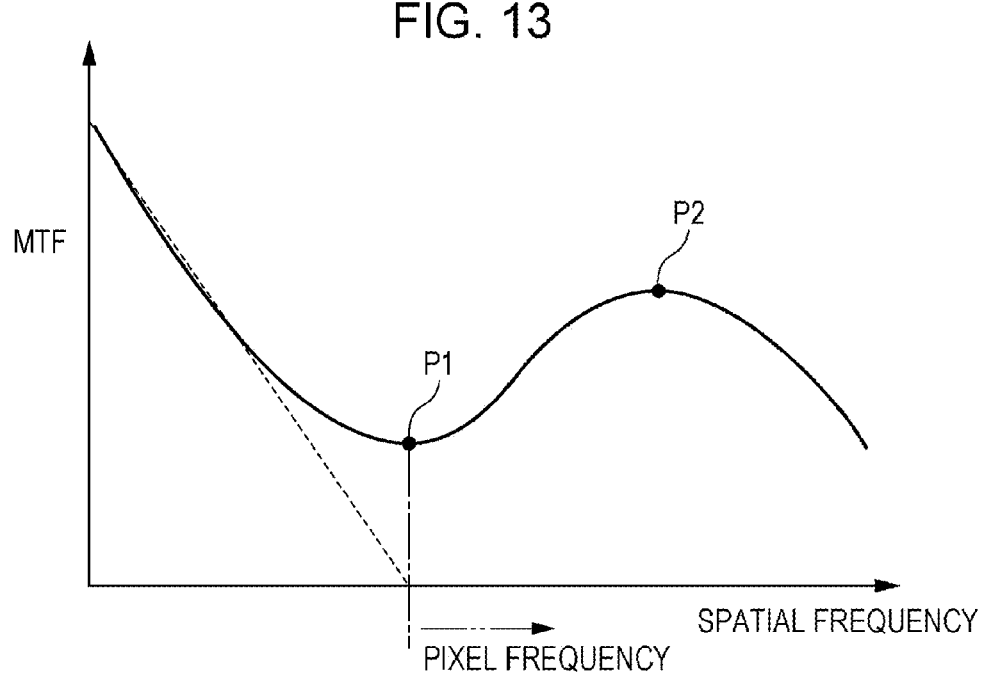
FIG. 13 is an explanatory diagram illustrating a correspondence between the MTF characteristics of the imaging device and the pixel period of the display element, in the spatial image display apparatus according to a second embodiment.

In the first embodiment, as illustrated in FIG. 12, since the plurality of pixels 41 of the display element 40 are arranged in a period corresponding to a frequency that is equal to or less than a minimum spatial frequency at which the MTF value relative to the spatial frequency of the imaging device 10 is minimized, it is possible to reduce the image quality deterioration of the spatial image due to variations in the MTF characteristics of the imaging device 10. In contrast, in the spatial image display apparatus according to the present embodiment, as illustrated in FIG. 13, the plurality of pixels 41 of the display element 40 are arranged in a period corresponding to a frequency higher than the minimum spatial frequency at which the MTF value relative to the spatial frequency of the imaging device 10 is minimized. In the present embodiment, a description will be given about a method of reducing the image quality deterioration of the spatial image, even when the plurality of pixels 41 are arranged at a resolution higher than the minimum spatial frequency.

Figure 14:
FIG. 14 is a block diagram for brightness adjustment of the display element, in the spatial image display apparatus according to the second embodiment.
Figure 15:
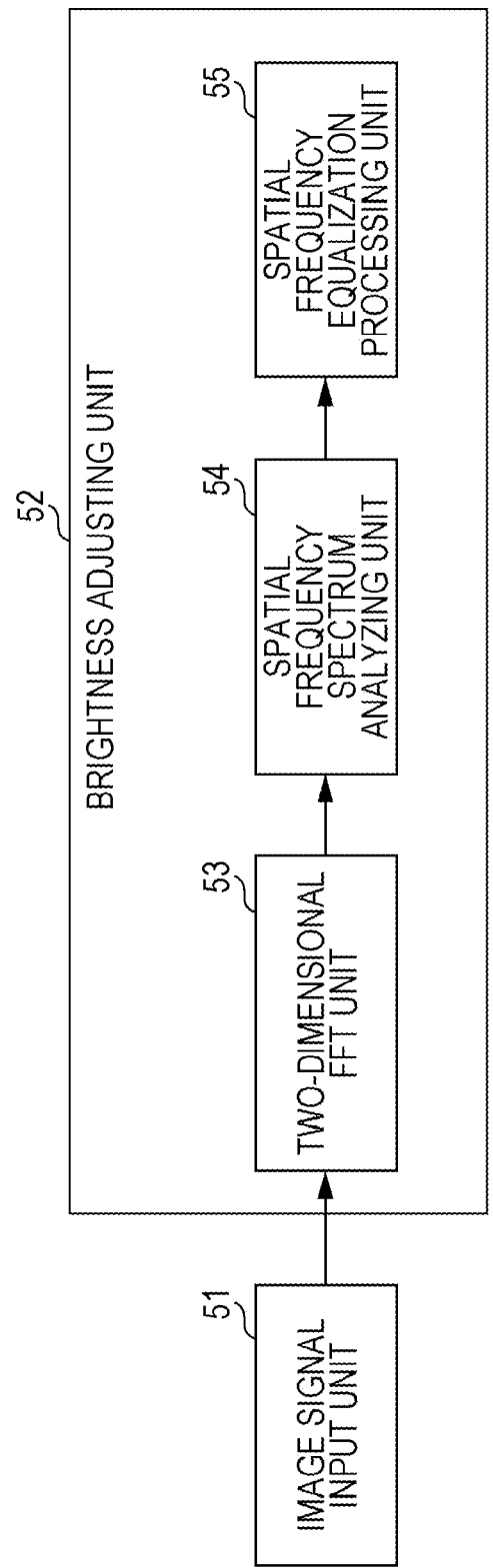
FIG. 15 is a block diagram illustrating a configuration example of the brightness adjusting unit illustrated in FIG. 14.

The spatial image display apparatus according to the present embodiment includes, as illustrated in FIG. 14, an image signal input unit 51, a brightness adjusting unit 52, and a drive circuit unit 50. The brightness adjusting unit 52 includes, as illustrated in FIG. 15, a two-dimensional fast Fourier transform (FFT) unit 53, a spatial frequency spectrum analyzing unit 54, and a spatial frequency equalization processing unit 55. In addition, in the spatial image display apparatus according to the present embodiment, the configuration of the parts other than the period and the circuit configuration of the pixel 41 may be substantially similar to FIG. 1.

The brightness adjusting unit 52 adjusts the brightness of the input image signal which is input through the image signal input unit 51, based on the MTF characteristics relative to the spatial frequency of the imaging device 10, and outputs the input image signal after the adjustment to the drive circuit unit 50. The drive circuit unit 50 displays the display image based on the input image signal after adjustment, on the display element 40.

Figure 16:
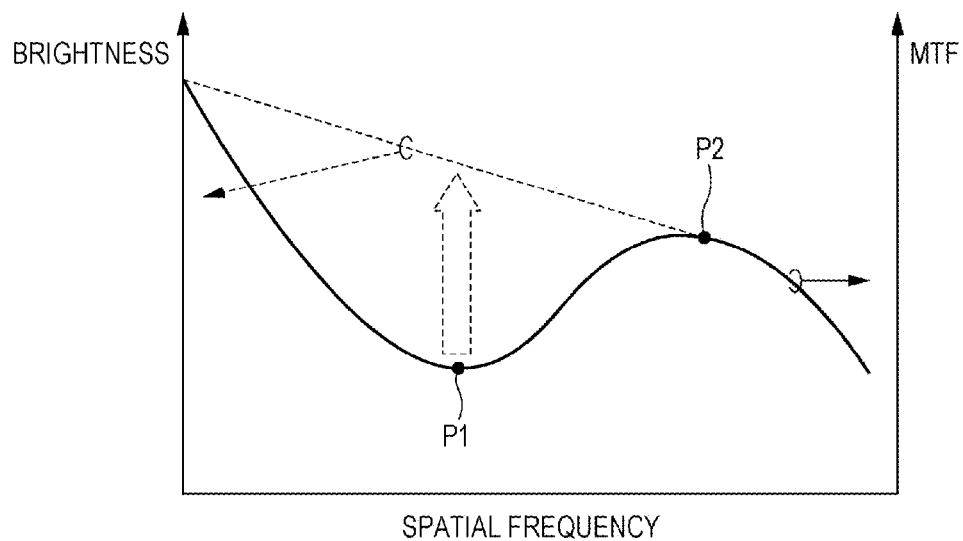
FIG. 16 is an explanatory diagram illustrating a first example of brightness adjustment.
Figure 17:
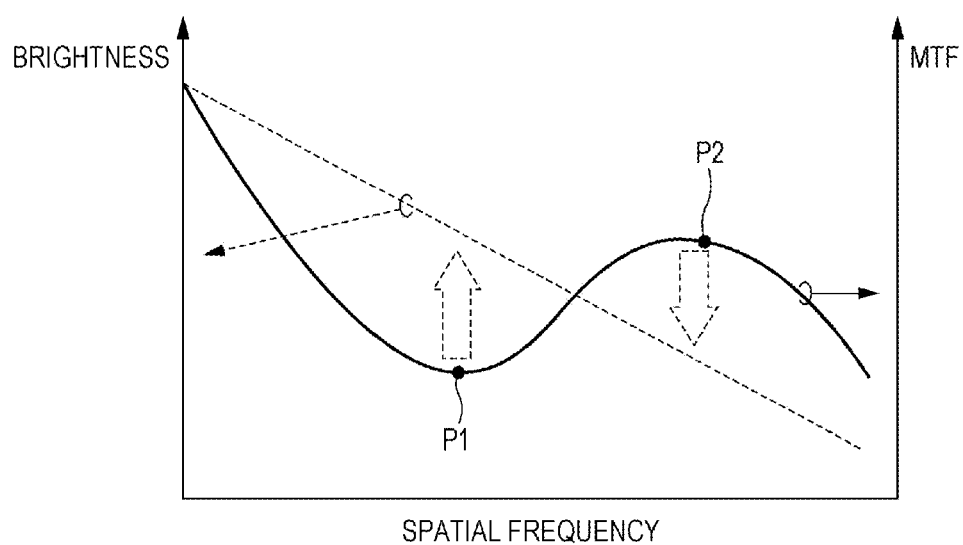
FIG. 17 is an explanatory diagram illustrating a second example of brightness adjustment.

FIG. 16 and FIG. 17 illustrate examples of the adjustment of the brightness by the brightness adjusting unit 52. In FIG. 16 and FIG. 17, the solid line represents the change of the MTF relative to the spatial frequency of the imaging device 10. The dashed line represents the change in the brightness relative to the spatial frequency after brightness adjustment by the brightness adjusting unit 52. For example, as illustrated in FIG. 16, the brightness adjusting unit 52 increases the brightness of the image portion corresponding to a frequency that is equal to or less than the maximum spatial frequency at which the MTF value is the maximum relative to the spatial frequency of the imaging device 10, in the input image signal. Thus, although the imaging performance of the imaging device 10 itself does not change, the brightness of the image displayed on the display element 40 is adjusted so as to compensate for the variations in the MTF relative to the spatial frequency of the imaging device 10, and as a result, it is possible to reduce image quality deterioration of the real image 100 formed by the imaging device 10.

As a result, the adjustment of the brightness by the brightness adjusting unit 52 may be adjusted so as to reduce the variation in the brightness relative to the spatial frequency. For this reason, for example, as illustrated in FIG. 17, adjusting may be performed so as to increase the brightness of the image portion having a spatial frequency in the vicinity of the minimum point P1 of the MTF, and reduce the brightness of the image portion having a spatial frequency in the vicinity of the maximum point P2, with respect to the input image signal. Thus, as a result, it is possible to provide the real image 100 in which the variation in the brightness relative to the spatial frequency is small and the observer 1000 rarely feels discomfort.

As described above, according to the present embodiment, since the brightness of the input image signal is adjusted based on the MTF characteristics relative to the spatial frequency of the imaging device 10, even when a plurality of pixels 41 of the display element 40 are arranged with a high resolution, it is possible to reduce the image quality degradation in the spatial image due to the variations in the MTF characteristics of the imaging device 10. Thus, it is possible to obtain a spatial image with a good visibility.

3. Third Embodiment

Spatial Image Display Apparatus Using Polarizer

Next, a description will be given about a spatial image display apparatus according to the third embodiment of the present disclosure. In addition, substantially the same parts as in the spatial image display apparatus according to the first and second embodiments are denoted by the same reference numerals in the following, and a description thereof will be omitted as appropriate.

Figure 18:
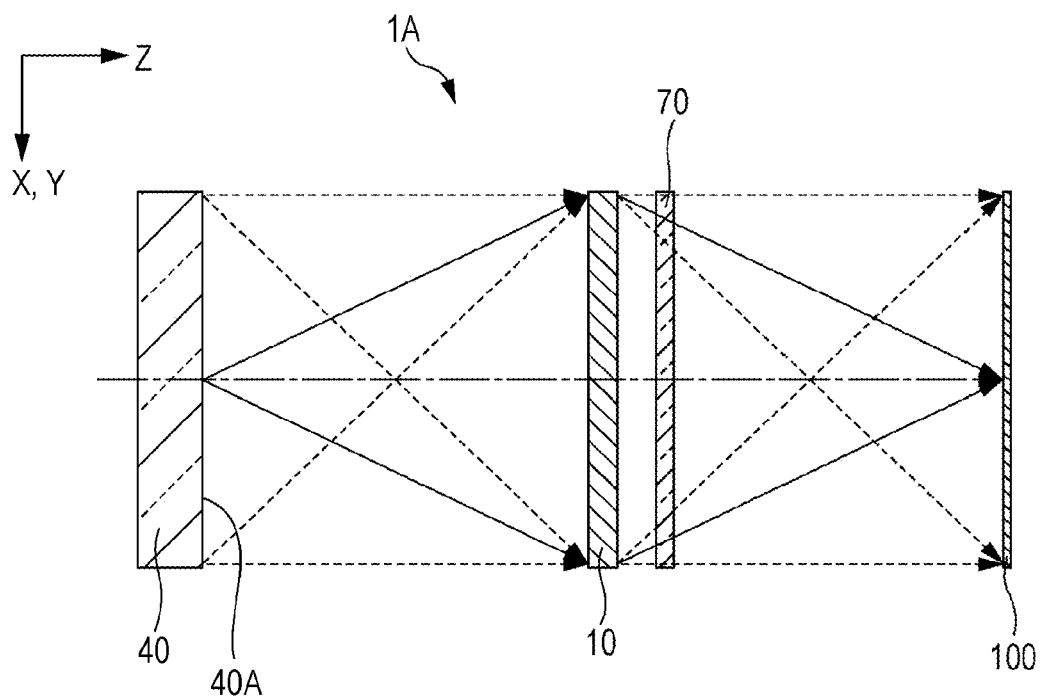
FIG. 18 is a cross-sectional view illustrating a configuration example of the spatial image display apparatus according to a third embodiment.

FIG. 18 illustrates a configuration example of a spatial image display apparatus 1A according to the present embodiment. The spatial image display apparatus 1A further includes a polarizer 70 transmitting light of a specific polarization direction between the imaging device 10 and the real image 100. The display element 40 may display a display image polarized in a specific polarization direction.

In addition, in the spatial image display apparatus 1A according to the present embodiment, the configuration of the parts other than the polarizer 70 may be substantially the same as the spatial image display apparatus according to the first or second embodiment. Although FIG. 18 illustrates the case where the image display surface 40A of the display element 40 is disposed so as to be substantially parallel to the substrate surface of the imaging device 10 as an example, as illustrated in FIG. 1, the polarizer 70 may be disposed even in the case where the image display surface 40A is disposed so as to be inclined to the substrate surface of the imaging device 10. Further, as illustrated in FIG. 3, the polarizer 70 may be disposed even in the case where the image display surface 40A is disposed so as to be substantially perpendicular to the substrate surface of the imaging device 10.

Since the imaging device 10 is a structure with large external light diffraction, if an observer tries observation under a particularly bright environment, the attention of the observer 1000 is directed to the diffracted light of the imaging device 10, and thus there is a problem in that it is difficult to observe the real image 100.

When the display element 40 displays a display image that is polarized in a specific polarization direction, as a liquid crystal display, in order to improve the external light contrast, it is desirable to provide the polarizer 70 mainly transmitting light in the specific polarization direction, between the imaging device 10 and the real image 100. This enables approximately a 50% reduction of the incidence of the external light to the imaging device 10. Therefore, diffracted and scattered light from external light in the imaging device 10 does not bother the observer 1000, and thus it is possible to provide a good spatial image.

4. Fourth Embodiment

Application Cases of Spatial Image Display Apparatus

The spatial image display apparatuses according to the first to third embodiments are applicable to the field, for example, as follows.

Figure 19:
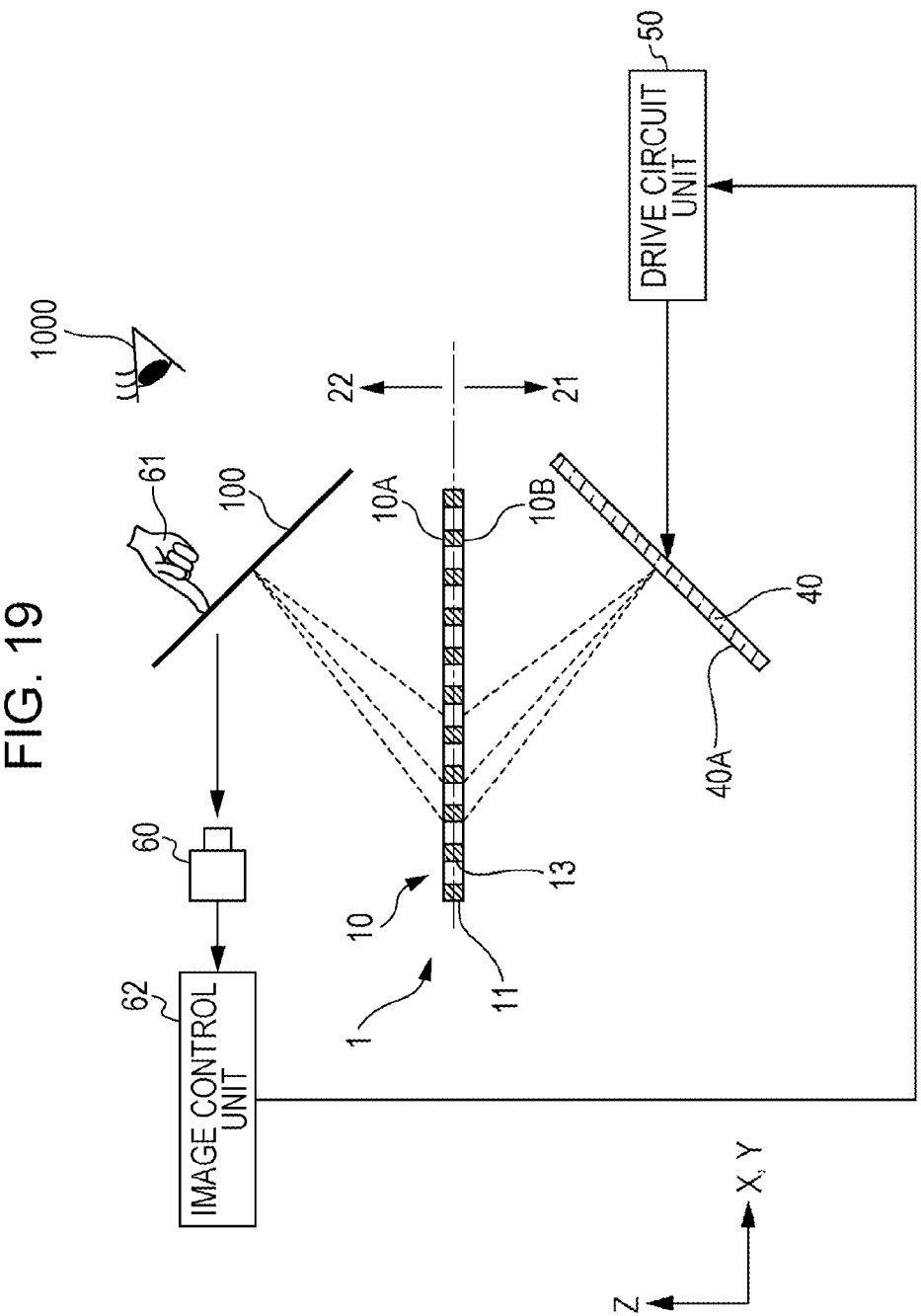
FIG. 19 is a cross-sectional view illustrating a configuration example of the spatial image display apparatus according to a fourth embodiment.

Further, the spatial image display apparatuses according to the first to third embodiments, as illustrated in FIG. 19, may further include a detection unit 60 as a spatial sensor detecting an indication tool 61 such as a finger, and an image control unit 62 controlling the content of the display image of the display element 40, based on the detection result of the detection unit 60. Thus, the operator may perform, for example, a pointing operation of the same sensation on a floating image (real image 100) as when operating the touch panel of a tablet terminal and the like with a finger or the like. This enables not only performing image display, but also providing interactive information display.

Such interactive information display is applicable to, for example, the display device of a medical field. For example, in a medical-examination site of the medical field, if a doctor touches objects other than a patient after touching a patient with the hands with gloves, there is a risk of infection. If using an interactive video interface using the floating image as the spatial image display apparatus according to the present disclosure, such a possibility is eliminated.

In addition, the spatial image display apparatus according to the present disclosure is applicable as a digital signage (electronic signage), such as a poster and a guide plate.

Further, the spatial image display apparatus according to the present disclosure is applicable as a display device for a vehicle such as a car navigation system or a head up display.

Further, the spatial image display apparatus according to the present disclosure is applicable to safety signs, and the like on the road. By using the floating image for the safety signs on the road, it is possible to perform display while giving less traffic hindrance.

5. Other Embodiments

The technology according to the present disclosure may be variously modified without being limited to the description of the above embodiment.

For example, the present technology can have the following configuration.

(1)

A spatial image display apparatus including:

a display element including a plurality of pixels which are two-dimensionally arranged; and an imaging device that includes a substrate having a plurality of dihedral corner reflectors arranged, in which the display element is disposed in a first space on one main surface of the substrate, and the imaging device forms a real image of a display image by the display element, in a second space on the other main surface of the substrate, wherein the plurality of pixels are arranged in a period corresponding to a frequency that is equal to or less than a minimum spatial frequency at which an MTF value relative to a spatial frequency of the imaging device is minimized.

(2)

The spatial image display apparatus according to (1), further including:

a polarizer that transmits light of a specific polarization direction, between the imaging device and the real image.

(3)

The spatial image display apparatus according to (1) or (2), wherein the display element displays a display image which is polarized in the specific polarization direction.

(4)

A spatial image display apparatus including a display element that includes a plurality of pixels which are two-dimensionally arranged, and displays an image based on an input image signal;

an imaging device that includes a substrate having a plurality of dihedral corner reflectors arranged, in which the display element is disposed in a first space on one main surface of the substrate, and the imaging device forms a real image of a display image by the display element, in a second space on the other main surface of the substrate; and a brightness adjusting unit that adjusts brightness of the input image signal, based on MTF characteristics relative to the spatial frequency of the imaging device.

(5)

The spatial image display apparatus according to (4), wherein the brightness adjusting unit adjusts brightness of the input image signal so as to suppress a brightness variation due to the MTF characteristics.

(6)

The spatial image display apparatus according to (5), wherein the brightness adjusting unit increases brightness of an image portion corresponding to a frequency that is equal to or less than a maximum spatial frequency at which an MTF value is maximized relative to the spatial frequency of the imaging device, in the input image signal.

(7)

The spatial image display apparatus according to any of (4) to (6),
wherein the plurality of pixels of the display element are arranged in a period corresponding to a frequency higher than a minimum spatial frequency at which an MTF value relative to the spatial frequency of the imaging device is minimized.

(8)

The spatial image display apparatus according to any of (4) to (7), further including
a polarizer that transmits light of a specific polarization direction, between the imaging device and the real image.

(9)

The spatial image display apparatus according to (8), wherein the display element displays a display image which is polarized in the specific polarization direction.

It should be understood by those skilled in the art that various modifications, combinations, sub-combinations and alterations may occur depending on design requirements and other factors insofar as they are within the scope of the appended claims or the equivalents thereof.

What is claimed is:

1. A spatial image display apparatus comprising:
a display element including a plurality of pixels which are two-dimensionally arranged; and
an imaging device that includes a substrate having a plurality of dihedral corner reflectors arranged, in which the display element is disposed in a first space on one main surface of the substrate, and the imaging device forms a real image of a display image by the display element, in a second space on the other main surface of the substrate,
wherein an MTF value of the imaging device relative to a spatial frequency of the imaging device decreases to a minimum value and then increases as a function of increasing spatial frequency and wherein the plurality of pixels of the display element are arranged in a period corresponding to a frequency that is equal to or less than a minimum spatial frequency at which the MTF value of the imaging device has the minimum value.

2. The spatial image display apparatus according to claim 1, further comprising:
a polarizer that transmits light of a specific polarization direction, between the imaging device and the real image.

3. The spatial image display apparatus according to claim 2,
wherein the display element displays a display image which is polarized in the specific polarization direction.

* * * * *